(12) United States Patent
Bader et al.

(10) Patent No.: US 10,145,040 B2
(45) Date of Patent: Dec. 4, 2018

(54) KNIT REINFORCING FABRIC

(71) Applicant: E I DU PONT DE NEMOURS AND COMPANY, Wilmington, DE (US)

(72) Inventors: Yves Bader, Crozet (FR); Benoit Steffenino, St. Julien en Genevois (FR)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 334 days.

(21) Appl. No.: 14/883,937

(22) Filed: Oct. 15, 2015

(65) Prior Publication Data

US 2016/0168767 A1     Jun. 16, 2016

Related U.S. Application Data

(60) Provisional application No. 62/090,907, filed on Dec. 12, 2014.

(51) Int. Cl.
| | |
|---|---|
| D04B 1/16 | (2006.01) |
| D04B 1/22 | (2006.01) |
| F16L 11/02 | (2006.01) |

(52) U.S. Cl.
CPC ............ D04B 1/16 (2013.01); D04B 1/22 (2013.01); D04B 1/225 (2013.01); F16L 11/02 (2013.01); *D10B 2331/021* (2013.01)

(58) Field of Classification Search
CPC . D04B 1/16; D04B 1/22; D04B 1/225; D10B 2331/021; F16L 11/02
See application file for complete search history.

(56) References Cited

U.S. PATENT DOCUMENTS

| | | | |
|---|---|---|---|
| 3,201,954 A | 8/1965 | Greczin | |
| 4,679,599 A * | 7/1987 | Newberry | F16L 11/085 138/104 |
| 4,845,963 A * | 7/1989 | Parekh | D04B 21/00 428/102 |
| 5,386,646 A * | 2/1995 | Saarikettu | B01D 39/083 34/582 |
| 5,879,800 A * | 3/1999 | Geirhos | D02G 1/16 428/369 |
| 6,854,298 B2 * | 2/2005 | Relats | F16L 11/02 66/195 |
| 7,572,745 B2 | 8/2009 | Branch et al. | |
| 2013/0327433 A1 | 12/2013 | DuPont | |

FOREIGN PATENT DOCUMENTS

| | | |
|---|---|---|
| DE | 102013019392 | 6/2014 |
| EP | 1780458 | 5/2007 |

* cited by examiner

*Primary Examiner* — Arti Singh-Pandey
(74) *Attorney, Agent, or Firm* — Stephen J. Gombita

(57) ABSTRACT

A knit fabric suitable as a reinforcement for tubular elastomeric articles or a fiber-reinforced composite structure wherein
  (i) the fabric comprises a plurality of first filamentary yarns (first yarns) having a tenacity of 2.5-56 g/dtex and a linear density of 222-10000 dtex that form the loops of the knit of the fabric,
  (ii) the fabric further comprises at least one second filamentary yarn having a tenacity of 2.5-56 g/dtex and a linear density of 222-10000 dtex that, within a course of the fabric, passes in a helical direction in front of all first yarns in that course and is intertwined with at least some of the first yarns in an adjacent course, and
  (iii) within a course of the fabric, the length of second reinforcement yarn to the length of first yarn is in the ratio of from 1.0:1.72 to 1.0:6.0.

11 Claims, 12 Drawing Sheets

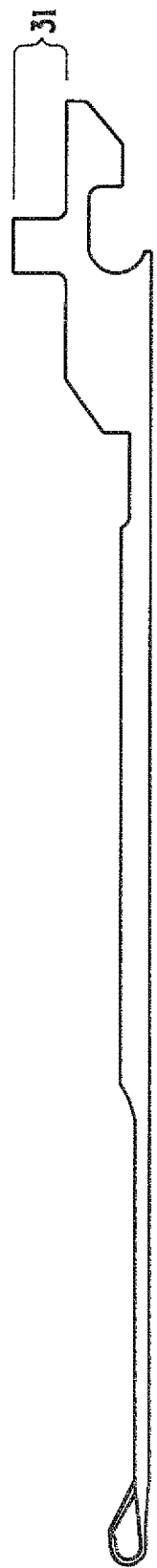
FIG. 3A
FIG. 3B

KNIT REINFORCING FABRIC

BACKGROUND

1. Field of the Invention

This invention relates to knitted reinforcement fabrics used for tubular elastomeric articles such as hoses for fluid conveyance or fiber-reinforced composite structures.

2. Description of Related Art

European patent number EP1780458B1 to Guo describes a pipe having a textile reinforcement presented in a form of a knit fabric which is formed of two threads having different rigidities so as to form mixed knots with a rigid thread and a less rigid thread in contact with each other. One thread is made of aromatic polyamide e.g. polyparaphenylene terephthalamide, and the other thread is made of aliphatic or aromatic polyamide e.g. polyamide 6.6 or copolymer of polyparaphenylene terephtalamide and 3, 4'-oxydiphenylene terephthalamide.

United States patent application publication number 2013/0327433 to Litchfield et al discloses a knit fabric suitable as a reinforcement for elastomeric articles comprising a plurality of reinforcement yarns wherein each course of the fabric comprises either a first or second yarn, the modulus of the first yarn being different from the modulus of the second yarn, and the courses comprising the first and second yarns are arranged in one of the following sequences, (a) alternating courses comprise first and second yarns respectively, (b) the courses form a repeat pattern of, in order, a course comprising a first yarn, two courses comprising a second yarn and a course comprising a first yarn or (c) the courses form a repeat pattern of, in order, a course comprising a second yarn, two courses comprising a first yarn and a course comprising a second yarn.

German publication DE 10 2013 019 392 to Matsumoto describes a method involving inducing a thread guide that supplies a knitting yarn that is knitted in a reverse direction. Another thread guide is introduced in travelling direction against the set direction. A redundant knitting yarn end is arranged in proximity of the former thread guide. A crossover yarn is connected with a base-knit-portion by the latter thread guide, and crosses the redundant knitting yarn end of a loop board. A pair of needle beds is extended in a transverse direction and arranged facing each other in longitudinal direction.

U.S. Pat. No. 7,572,745 to Branch et al discloses a flexible hose comprising a tube, a knit fabric, and a cover. The knit fabric comprises a hybrid yarn which comprises a first yarn of co-para-aramid fibers and a second yarn of meta-aramid fibers. The hose exhibits significantly improved burst pressure and/or improved impulse fatigue resistance.

There is an ongoing need to provide knitted fabrics of improved mechanical strength that can enhance the properties of articles comprising the fabric, for example to increase the pressure carrying capability of a rubber hose while maintaining a simple and cost effective one-step production method.

SUMMARY OF THE INVENTION

This invention pertains to a knit fabric suitable as a reinforcement for tubular elastomeric articles or a fiber-reinforced composite structure wherein
(i) the fabric comprises a plurality of first filamentary yarns (first yarns) having a tenacity of 2.5-56 g/dtex and a linear density of 222-10000 dtex that form the loops of the knit of the fabric,
(ii) the fabric further comprises at least one second filamentary yarn having a tenacity of 2.5-56 g/dtex and a linear density of 222-10000 dtex that, within a course of the fabric, passes in a helical direction in front of all first yarns in that course and is intertwined with at least some of the first yarns in an adjacent course, and
(iii) within a course of the fabric, the length of second reinforcement yarn to the length of first yarn is in the ratio of from 1.0:1.72 to 1.0:6.0.

BRIEF DESCRIPTION OF THE DRAWINGS

FIGS. 3A and 3B are examples of suitable knitting needles.

DETAILED DESCRIPTION

This invention pertains to a knit fabric. Knitting is the interlooping of yarn feedstock into vertical columns called wales and horizontal rows of loops called courses with fabric coming out of the knitting machine in the wales direction. Examples of knit fabric styles are plain stitch and interlock or lock stitch.

Fabric

Figure 1A:
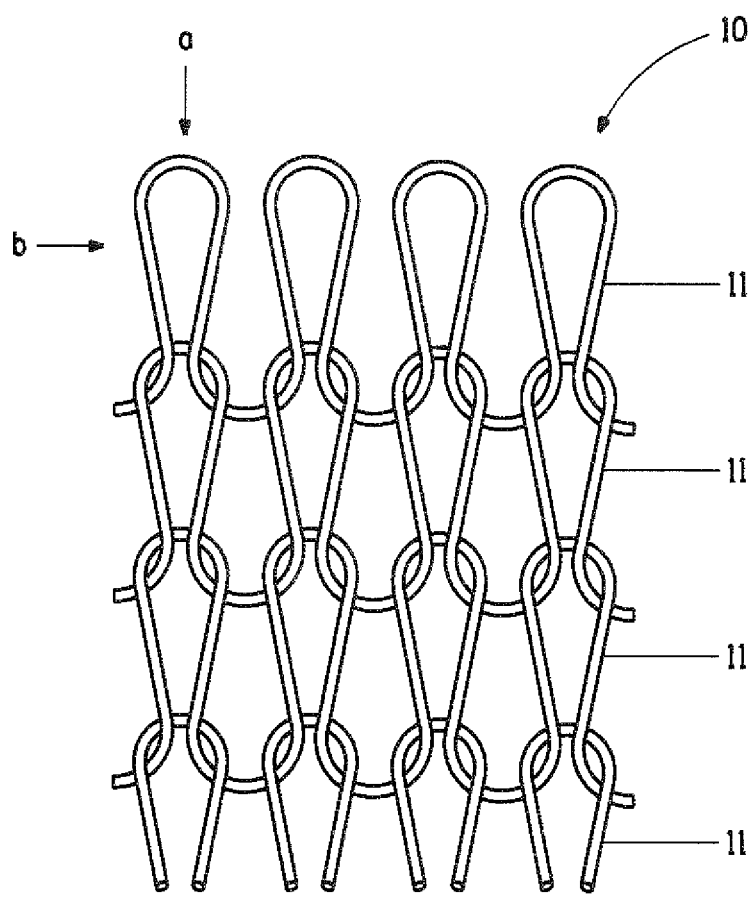
FIGS. 1A to 1D are views of part of prior art knit fabrics.

FIG. 1A shows a section of a prior art knitted fabric 10. Wales are chain loops that run lengthwise in the fabric and are indicated by the vertical orientation arrow "a". Courses are rows of loops running horizontally across the fabric and are indicated by the horizontal orientation arrow "b". Both these terms are well known in the textile art. The yarns 11 of this fabric are all the same and are either yarns of a single material or are blended (hybrid) yarns formed by twisting together at least two different yarns into a single hybrid yarn.

Figure 1B:
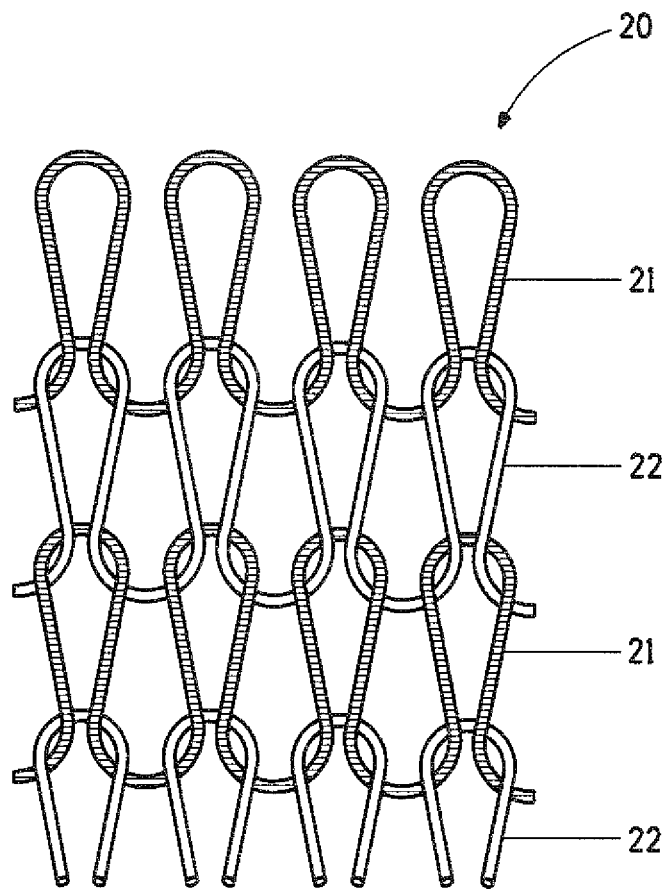

FIG. 1B shows at 20 a section of another prior art knitted fabric comprising alternating courses of yarns 21 and 22 respectively where yarns 21 and 22 are different.

Figure 1C:
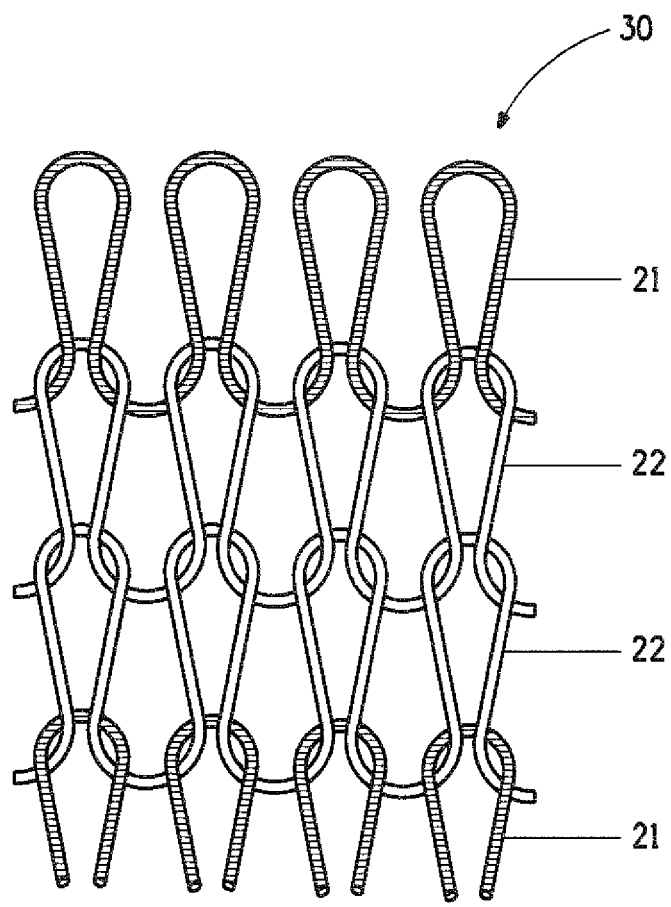

FIG. 1C shows at 30 a section of yet another prior art knitted fabric in which the courses form a repeat pattern of, in order, a course comprising a yarn 21, two courses comprising a second yarn 22 and a course comprising comprising a yarn 21 where yarns 21 and 22 are different.

Figure 1D:
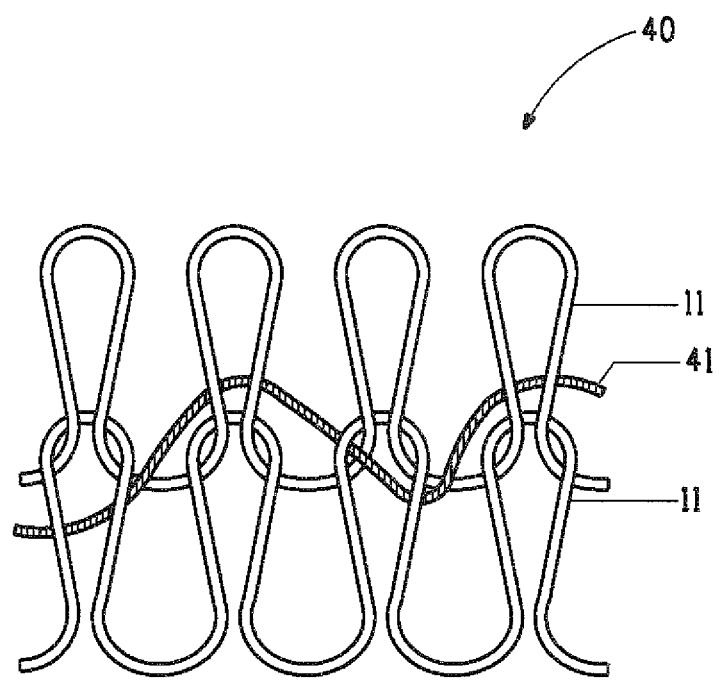

FIG. 1D shows generally at 40 a section of a prior art knit fabric in which yarn 41 is intertwined through yarns 11 in two adjacent courses of the fabric. The term "interwined" is someteimes referred to as "interlocked" or "interknitted".

Figure 2A:
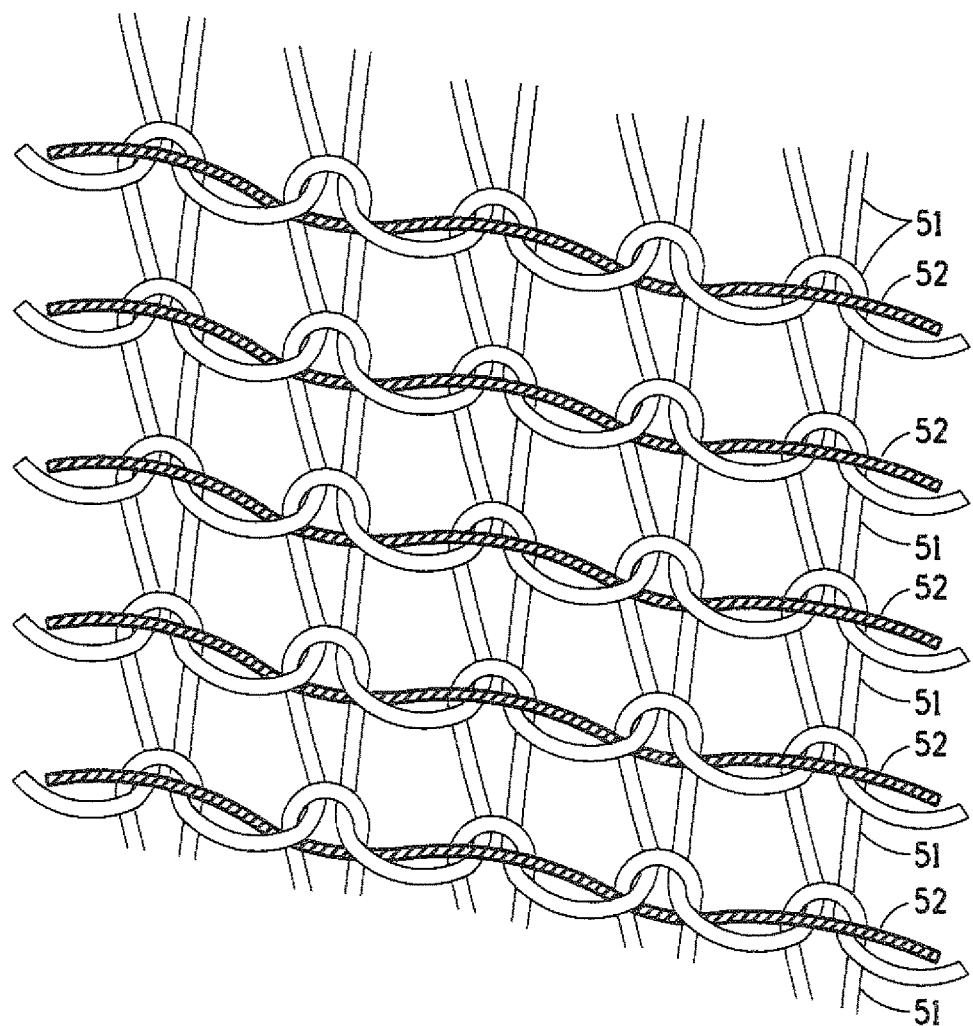
FIGS. 2A to 2E are views of embodiments of this invention.
Figure 2B:
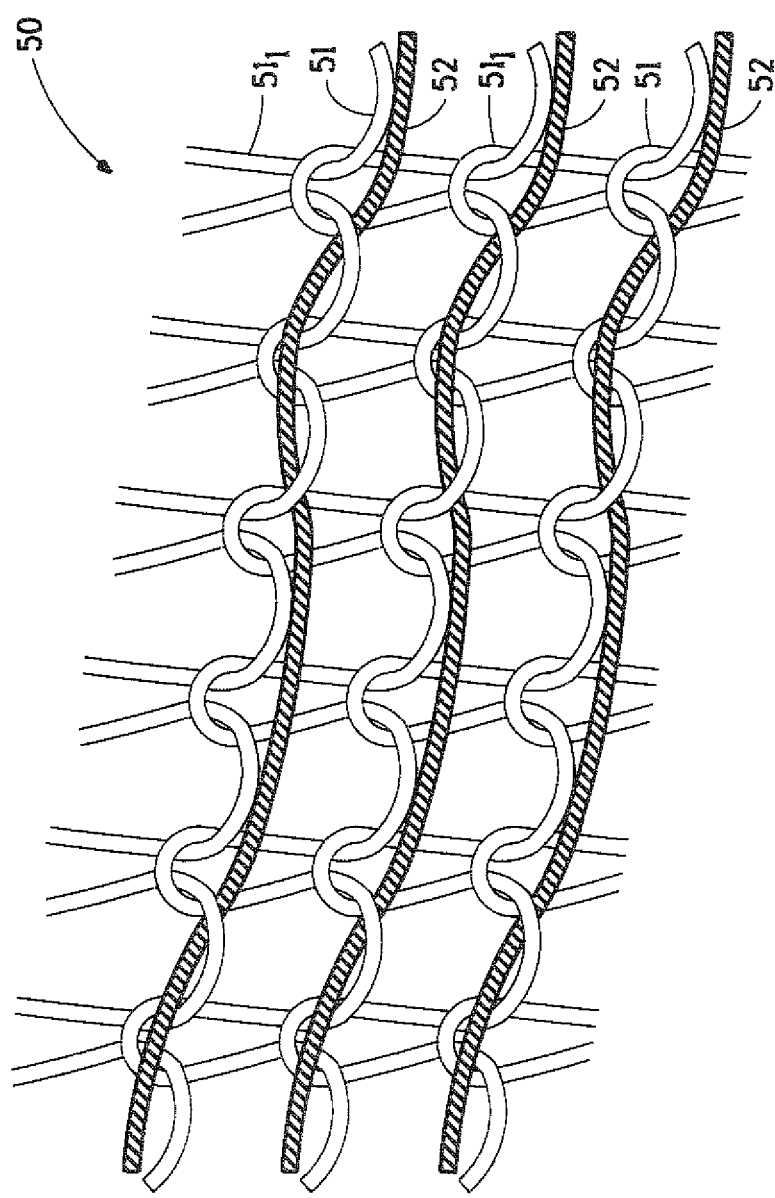

FIG. 2B shows generally at 50 a fabric of this invention. The fabric comprises a plurality of first filamentary yarns 51 or $51_1$ having a tenacity of 2.5-56 g/dtex (2.25-50 gpd) and a linear density of 222-10000 dtex to (200-9000 denier) that form the loops of the knit of the fabric. The fabric further comprises at least one second filamentary yarn 52 having a tenacity of 2.5-56 g/dtex (2.25-50 gpd) and a linear density of 222-10000 dtex (200-9000 denier) that, within a course of the fabric, passes in a helical direction in front of all first yarns 51 in that course and is intertwined with at least some of the first yarns $51_1$ in an adjacent course.

The first yarns provide reinforcement strength in the longtitudinal direction of the fabric and the second yarns provide additional strength in a hoop direction that is essentially orthogonal to the longtitudinal direction.

Preferably, within a course, the second yarn passes over the upper portion of a loop and through the lower portion of an interwined adjacent loop thereby interlockinging the second yarn with the first yarn. A loop is sometimes referred to as a stitch.

In some embodiments, the second yarn has an elongation at break that is greater than the elongation at break of the first yarn. In other embodiments, the modulus of the second yarn is less than the modulus of the first yarn.

Each course of the fabric comprises a first yarn. In some embodiments, the first yarn is the same throughout the fabric. In other embodiments, a first yarn in one course of the fabric may be different from a first yarn in another course of the fabric. By "different" is meant that the yarns may have a different composition e.g. p-aramid and m-aramid or, if the yarns are of the same composition, they have different physical properties such as tenacity, modulus and linear density e.g standard modulus p-aramid yarn Kevlar® 29 and intermediate modulus p-aramid yarn Kevlar® 49. In one embodiment, the polymer of the filaments of the first yarn is para-aramid and the polymer of the filaments of the second yarn is meta-aramid. In the context of this application, "different" also encompasses yarns made by different manufacturing methods e.g. continuous filament spun yarn, spun staple yarn, long staple yarn, stretch-broken yarn, core spun yarn and blended or hybrid yarn such terms being well known in the textile art. Two different first yarns may be arranged as shown at 51a and 51b in FIG. 2E. There are many other options of positioning different first yarns in different courses of a fabric. More than two different first yarns may also be used.

In some embodiments, the second yarn is the same throughout the fabric. In other embodiments, a second yarn in one course of the fabric may be different from a second yarn in another course of the fabric. By "different" is meant that the yarns may have a different composition or, if the yarns are of the same composition, they have different physical properties such as tenacity, modulus and linear density. In some embodiments, there is a second yarn intertwined through each course of the fabric as shown at 52 in FIG. 2A. In some other embodiments there may be courses that are free of second yarns such as in FIG. 2C where every second course is free of a second reinforcing yarn. Another example is a fabric in which every third course comprises a second yarn. Many other combinations exist for the positioning of the second yarn in the courses of the fabric. There may also be regions within the fabric where there is a heavier concentration of second yarns in one region compared to another region, such an arrangement being useful where there are areas of high stress concentration in the end use article. In one embodiment, the first yarn comprises filaments of a different polymer from the polymer of the filaments of the second yarn.

Figure 2C:
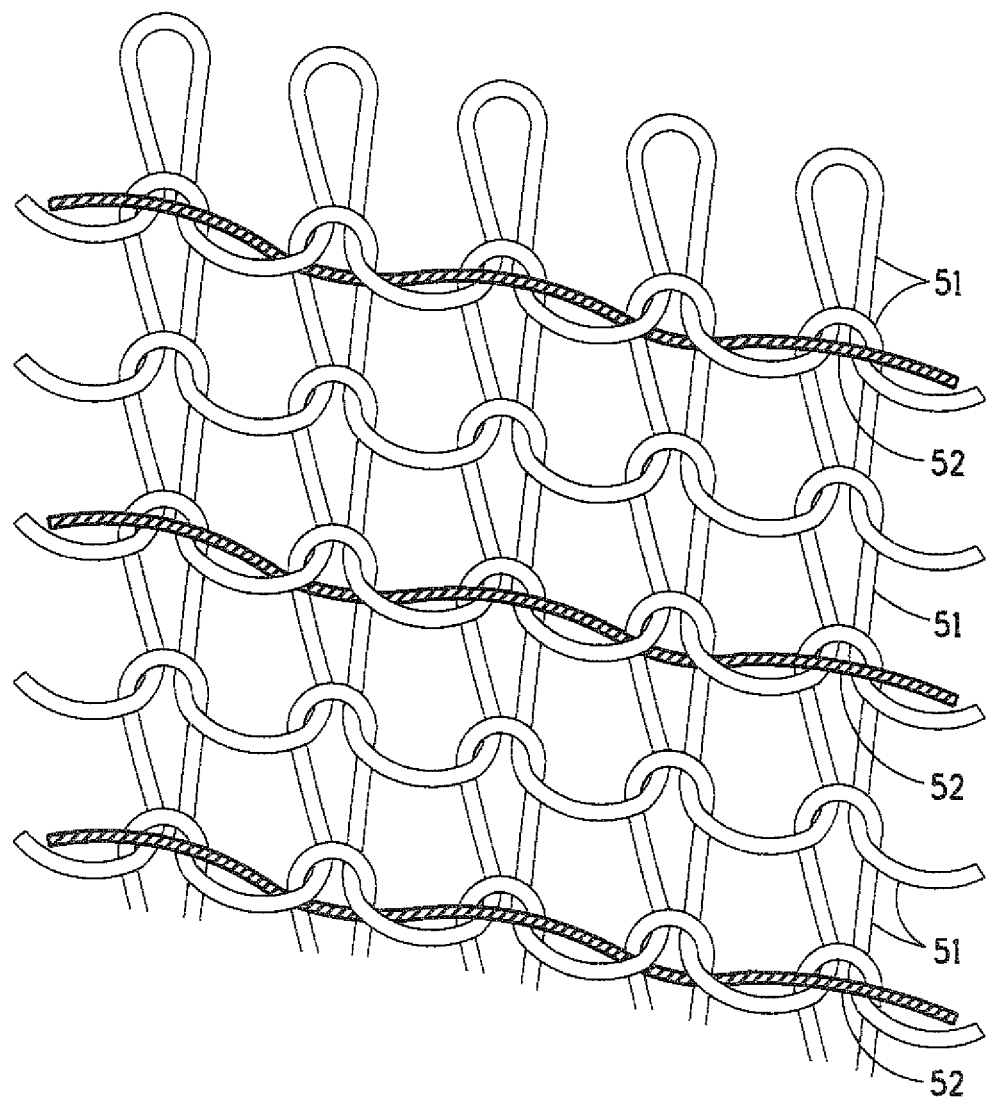
Figure 2D:
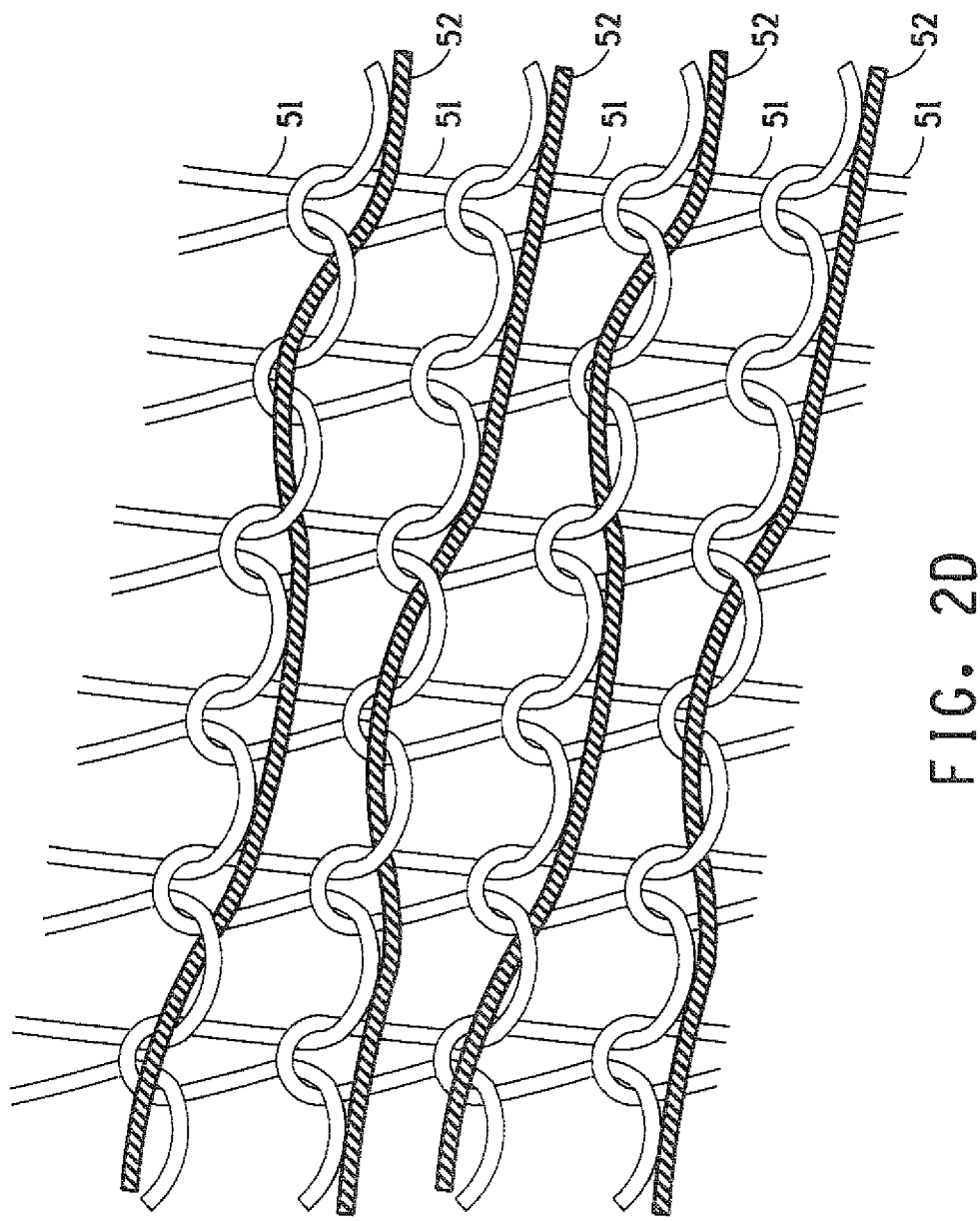

The desired fabric style is obtained by the appropriate selection and positioning of high and low butt knitting needles in the knitter head. FIG. 3A shows at 31 an example of a high butt needle and FIG. 3B at 32 an example of a low butt needle. A butt is a term well understood in the textile art and is described for example in section 3.14.2 of "Knitting Technology" $3^{rd}$ Edition, 2004 authored by David Spencer and published by Woodhead Publishing. For example, the positioning pattern for the second yarn in the fabric of FIGS. 2A and 2B is obtained by an arrangement of alternating high and low butt needles while the positioning pattern for the second yarn in the fabric of FIG. 2B is obtained by a repeat arrangement of one high and three low butt needles. FIG. 2D shows another embodiment in which the interlocking of the second yarn is offset in succesive courses. This will result in a flatter fabric compared to that of FIG. 2B where the interlocking of the second yarn is not offset in adajcent courses. Where it is desired to have a course that is free of second reinforcing yarns this can be achieved by having no second yarn feeder and no spools in the spool carrier feeding that particular course.

Within a course of the fabric, the length of second yarn to the length of first yarn is in the ratio of from 1.0:1.72 to 1.0:6.0.

Typical knitting heads are circular in design, therefore the resulting knitting pattern is helical and the rows repeat themselves as a function of the number of feeders and cams. The sequence of intertwining the second yarn within a course may be the same or different for different courses. FIGS. 2C and 2D show suitable examples of different sequences of interlocking the second yarn. The interlocking pattern of second yarns in different courses may be the same or different. For example, the interlocking pattern in each course of FIG. 2B is the same and the interlocking pattern in each course of FIG. 2C is the same. However, for example, within a fabric there may be an interlocking pattern like in FIG. 2B in some courses and an interlocking pattern like in FIG. 2C in other courses. In some fabrics there may be more than two different interlocking patterns. Fabrics comprising different second yarn interlocking patterns in different courses may be knitted on a Dobby knitting machine.

First and Second Reinforcing Yarns

Preferably the first and second reinforcing yarns comprise continuous filaments. Other forms of suitable yarn are stretch broken yarn, staple spun yarn, interlaced yarn, intermingled, comingled or entangled yarn. Blends of different yarn forms may also be considered. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the terms "fiber" is used interchangeably with the term "filament". The filaments of the yarns may be polymeric or inorganic. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). Another form of suitable yarn is stretch-broken yarn in which filaments having a length of from 2 to about 80 inches (about 5 cm to about 200 cm) are spun and twisted together to form single end yarns.

Examples of polymeric filaments are aromatic polyamide, aromatic copolyamide, polyazole, polyester, aliphatic polyamide, poly(trimethylene terephthalate) and blends thereof. Preferably, the aromatic polyamide used in the composition is para-aramid or copolymers of p-phenylene diamine such as products available under the tradenames Kevlar®, Twaron®, Heracron® or Technora®. Another aromatic polyamide is meta-aramid an example being Nomex®. Aliphatic polyamides include a range of nylon materials such as nylon 6,6.

Another suitable fiber is one based on aromatic copolyamide prepared by reaction of terephthaloyl chloride (TPA) with a 50/50 mole ratio of p-phenylene diamine (PPD) and 3, 4'-diaminodiphenyl ether (DPE) as is available under the tradename Rusar®. Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers. A suitable polyazole is polyoxadiazole such as is available under the tradename Arselon® from OJSC SvetlogorskKhimvolokno, Svetlogorsk, Belarus. A sulfonated form of polyoxadiazole is also suitable for use.

An example of polyester is polyethylene terephthalate (PET). An example of poly(trimethylene terephthalate) is Sorona®.

The first and second yarns may comprise the same or different polymers. As an example, the first reinforcement polymer may be para-aramid and the second reinforcement polymer may be meta-aramid or an aliphatic polyimide.

The second yarns may also be a merged yarn. A merge yarn is a yarn in which a plurality of component filaments or yarns are twisted together. This is sometimes referred to as a merge or hybrid cord.

Another form of yarn includes tape which may be a polymeric film or in fibrous form such as a woven tape.

Knitting Machine

Figure 4A:
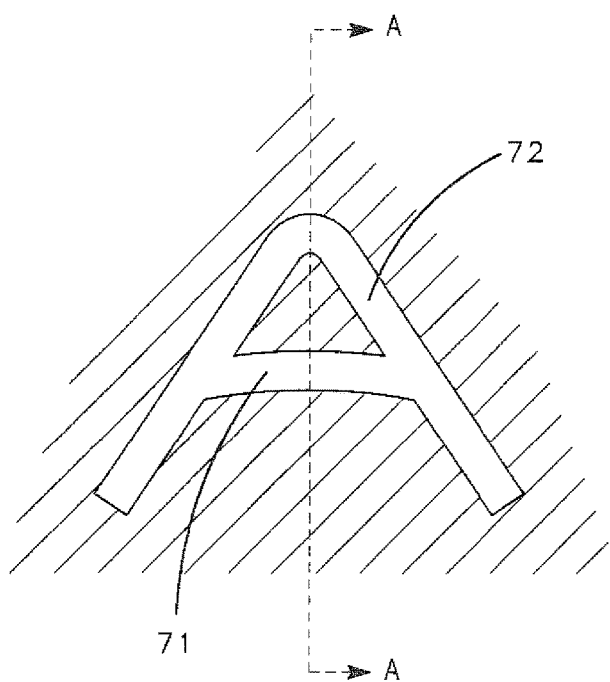
FIGS. 4A and 4B are sectional views through part of a cam track unit in the head of a knitting machine.
Figure 4B:
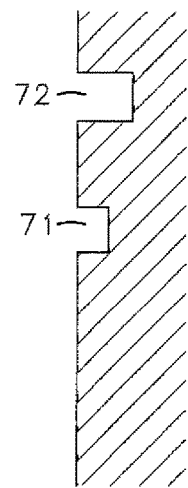

U.S. Pat. No. 3,201,954 to Greczin describes a method and apparatus for producing a reinforced flexible hose. The apparatus described is typical of one used to produce a knitted fabric. In order to accommodate the high and low butt needles required to produce a fabric of the current invention, it is necessary to modify the cam tracks of the kitting machine cams as shown in FIGS. 4A and 4B. FIG. 4A shows a section of a cam where the track divides into an inner track 71 and outer track 72. During the knitting process, the low butt needles traverse through the inner track and high butt needles traverse through the outer track. FIG. 4B is a section through line AA of FIG. 4A.

A suitable knitting machine for making a knit fabric of this invention is a circular knitting machine such as a Harry Lucas RRU—2×4s model number 5594 machine available from Knitting Machine & Supply Co., Inc. Clark, N.J. This machine is designed for knitting a cover around a rubber tube and can be built with up to two cam tracks for plain stitch patterns, two cams modified for lower needle sinking and 4-12 feed packages for the supply of filaments or textile yarns. The needles are selected having different heel heights (high and low heels) such as three short heel needles followed by one long heel needle. A Jacquard or Dobbi circular knitting machine may also be used.

Article

The knit fabric of this invention may be used as a reinforcement for polymeric or elastomeric articles.

Figure 5:
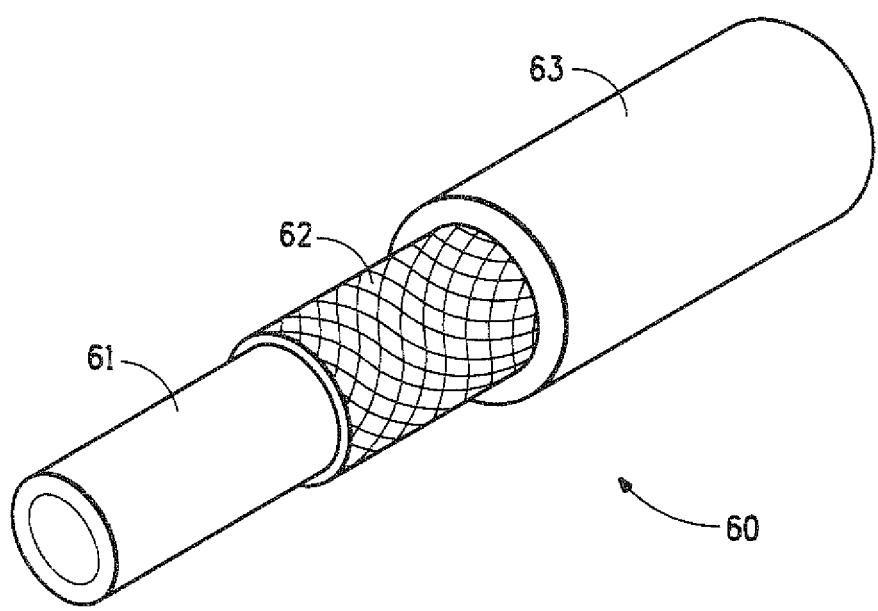
FIG. 5 is a schematic of a hose comprising a knit fabric of this invention.

Examples of elastomeric articles include tires and hoses. The fabric may be used as a load carrying component in the carcass of a tire. FIG. 5 depicts a schematic of a hose comprising a knit fabric of the present invention. The hose is shown generally at 60. The first component is a core tube 61 having a circumferential inner surface which conventionally contacts a fluid or gas and an opposing circumferential outer tube surface. In some embodiments, there may be a plurality of core tubes. The materials suitable for core tube 61 are elastomeric and are well known in is the art. Suitable examples include hydrogenated nitrile rubber, silicone rubber, fluorosilicone rubber, methylphenylsilicone rubber, natural rubber, EPDM, CPE and acrylic rubber. EPDM means ethylene propylene diene monomer rubber; CPE means chlorinated polyethylene. It is understood the elastomeric material which is chosen will be dependent on the final use of the hose. Illustratively, if a corrosive substance is to be transported through the hose, the elastomeric material is chosen to withstand such corrosion. The knit fabric reinforcement layer 62 surrounds the outer surface of the core tube. An elastomeric layer 63 surrounds the reinforcement layer 62 on its outer surface. The type of elastomer can be the same or different relative to the core 61. In some embodiments, there may be a plurality of layers 63. Layer 63 may also be reinforced by filamentary material embedded within the layer preferably oriented in the same direction as the second reinforcement yarn in the knit fabric. It is understood that various constructions may be employed. Illustratively, more than two reinforcement layers 62 can be utilized. Furthermore, the core tube 61 can be lined on its inner surface with a fluorocarbon-based material which will contact the fluid or gas to be transported. Suitable examples of such lining materials include poly(tetrafluoroethylene) and perfluoroalkoxy polymer.

Another example of the use of the knit fabric is in a fiber-reinforced polymeric composite structure comprising the knit reinforcement and a matrix resin which may be thermoplastic or thermoset. Typically, the fabric comprises from 25 to 55 weight percent of the weight of fabric plus matrix. In some embodiments the fabric comprises from 30 to 45 weight percent of the weight of fabric plus matrix. Exemplary thermoset matrix resins are epoxy, phenolic, polyester, bismaleimide and cyanate ester. Exemplary thermoplastic resins are polyetheretherkenone (PEEK), polyetherketoneketone (PEKK), polyethersulfone (PES), polyarylsulfone (PAS), polyethylene and polypropylene.

EXAMPLES

Examples prepared according to the process or processes of the current invention are indicated by numerical values. Control or Comparative Examples are indicated by letters. In the following examples:

Y1, the first reinforcement yarn, is a para-aramid twisted yarn available under the tradename Kevlar® 29 AP from E. I. DuPont de Nemours and Company, Wilmington, Del. (hereinafter DuPont) having a nominal tenacity of 28.3 g/dtex (25.5 g/denier), a nominal modulus of 117 GPa and a nominal linear density of 2500 dtex (2250 denier).

Y2, the second reinforcement yarn, is a meta-aramid 1340 dtex twisted yarn available under the tradename Nomex® 430 from DuPont having a nominal tenacity of 5.5 g/dtex (5.0 g/denier), a nominal modulus of 12.7 GPa and a nominal linear density of 1340 dtex (1206 denier).

Y3, an alternative first reinforcement (the third yarn), is a meta-aramid twisted yarn available under the tradename Nomex® 430 from DuPont having a nominal tenacity of 5.5 g/dtex (5.0 g/denier), a nominal modulus of 12.7 GPa and a nominal linear density of 3570 dtex (3213 denier).

Example A

A knit reinforcement fabric can be made on a conventional multi-feed circular knitting machine.

A jersey or terry knit fabric, also known in the hose trade as a plain stitch, can be knitted from Y1 (11) such that there are 10 courses per inch (4 courses per cm) as is exemplified by FIG. 1A.

A hose may be made by the extrusion of uncured ethylene propylene diamine (EPDM) compound as an annular tube of circular cross-section. The EPDM compound may be of the type typically used for long life or standard coolant or heater hose applications. The tube is then covered with the knit fabric of Example A. The tube with knitted yarn overlay is then passed through an annular extrusion die that applies a layer of extended EPDM compound as the 'cover layer' to protect the knit from damage and to provide body to the overall hose structure. EPDM compound information can be found in trade literature such as the RT Vanderbilt Rubber Handbook 13$^{th}$ edition, 1990. The three component assembly is then cut to lengths and formed over steel or aluminum mandrels to be molded into the desired shape during cure in steam at 150 degrees C. for 15 minutes. The cured rubber hoses are then removed from the mandrels after cooling and subsequently cleaned, trimmed, and tested for specification compliance.

Example 1

The knitting cams on a knitting machine are set-up for full or half loop sinking in relation to the height of the needles A jersey or terry knit fabric can be knitted from first yarns Y1 (51). The knitting machine is set up for second yarn Y2 (52) delivery and the knitting head cylinder is prepared with 15 short heels and 15 long heels. If an 8 feed knitter is used, then 4 packages of Y1 and 4 packages of Y2 are placed in a regular alternating pattern on the knitter deck. The knitter places 10 courses per inch (4 course per cm) along the length of the hose and uses 30 needles (15 short butt needles and 15 long butt needles in a repeat arrangement of 1 long butt needle followed by 1 short butt needle) so as to produce a fabric of FIG. 2A.

The ratio of the length of second reinforcement yarn Y2 to the length of first reinforcement yarn Y1 within a course is in the ratio of 1.0:2.9

A hose may be made by a similar method to that of Example A except that the knit fabric of Example 1 is used Example 2

The knitting cams on a knitting machine are set-up for full or half to loop sinking in relation to the height of the needles. A jersey or terry knit fabric can be knitted from first yarns Y1 (51). The knitting machine is set up for second yarn Y2 (52) delivery and the knitting head cylinder is prepared with 24 short heels and 6 long heels. If an 8 feed knitter is used, then 4 packages of Y1 and 4 packages of Y2 are placed in a regular alternating pattern on the knitter deck. The knitter places 10 courses per inch (4 course per cm) along the length of the hose and uses 32 needles (24 short butt needles and 8 long butt needles in a repeat arrangement of 1 long butt needle followed by 3 short butt needles) so as to produce a fabric of FIG. 2B.

The ratio of the length of second reinforcement yarn Y2 to the length of first reinforcement yarn Y1 within a course is in the ratio of 1.0:4.0

A hose may be made by a similar method to that of Example A except that the knit fabric of Example 2 is used.

Example 3

The knitting cams on a knitting machine are set-up for full or half loop sinking in relation to the height of the needles. A jersey or terry knit fabric can be knitted from first yarns Y1 (51). The knitting machine is set up for second yarn Y2 (52) delivery and the knitting head cylinder is prepared with 15 short heels and 15 long heels. If an 8 feed knitter is used, then 4 packages of Y1 and 2 packages of Y2 are placed in the following sequence Y1, Y2, Y1, no yarn, Y1, Y2, Y1, no yarn on the knitter deck. The knitter places 10 courses per inch (4 course per cm) along the length of the hose and uses 30 needles (15 short butt needles and 15 long butt needles in a repeat arrangement of 1 long butt needle followed by 1 short butt needles) so as to produce a fabric of FIG. 2C).

The ratio of the length of second reinforcement yarn Y2 to the length of first reinforcement yarn Y1 within the course where the two yarns are present is in the ratio of 1.0:2.9

A hose may be made by a similar method to that of Example A except that the knit fabric of Example 3 is used.

Example 4

A Dobbytronic knitting head is used. A jersey or terry knit fabric can be knitted from first yarns Y1 (51). The knitting machine is set up for second yarn Y2 (52) delivery and the knitting head cylinder is prepared with special needles that can independently be selected. If an 8 feed knitter is used, then 4 packages of Y1 and 4 packages of Y2 are placed in a regular alternating pattern on the knitter deck. The knitter places 10 courses per inch (4 course per cm) along the length of the hose and uses 30 needles so as to produce a fabric of FIG. 2D.

The ratio of the length of second reinforcement yarn Y2 to the length of first reinforcement yarn Y1 within the course where the two yarns are present is in the ratio of 1.0:4.0

A hose may be made by a similar method to that of Example A except that the knit fabric of Example 4 is used Example 5

Figure 2E:
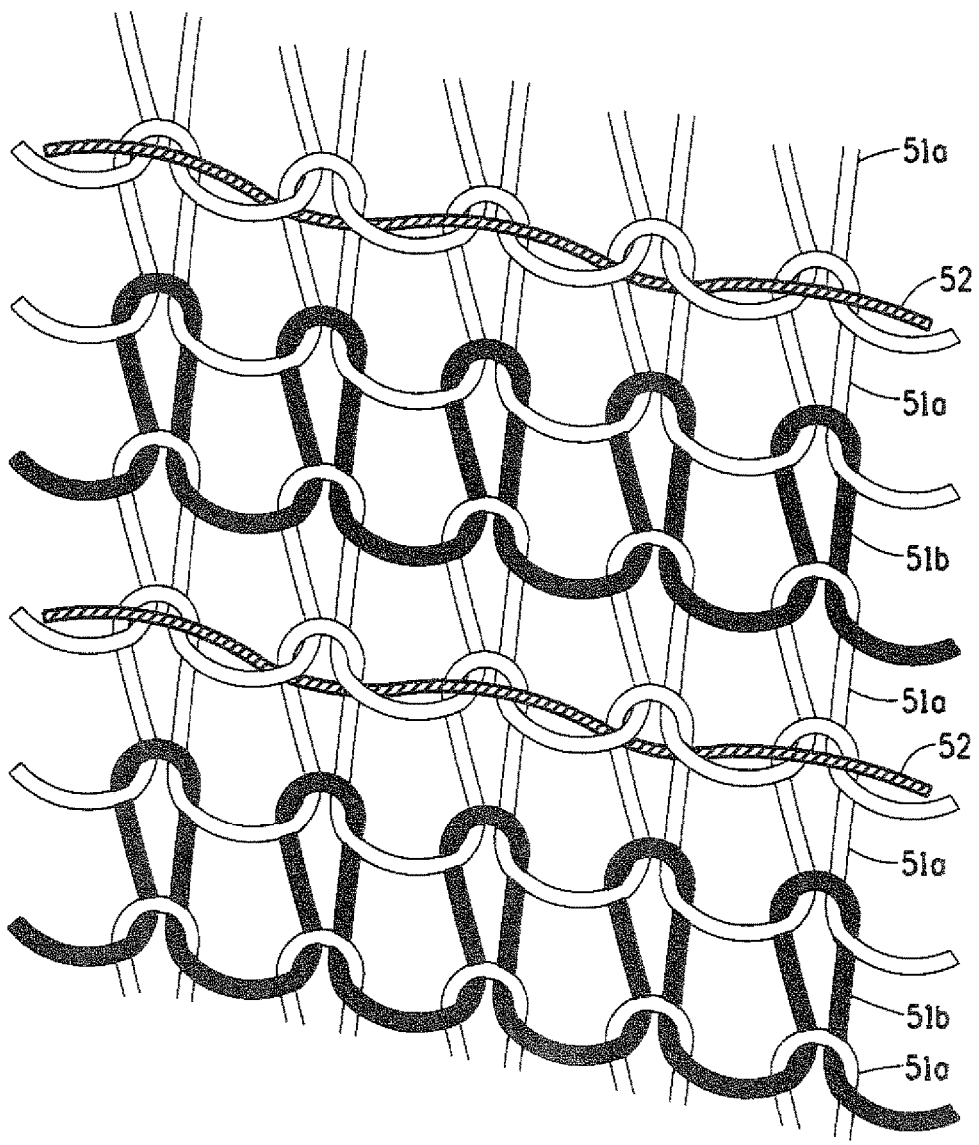

The knitting cams on a knitting machine are set-up for full or half loop sinking in relation to the height of the needles A jersey or terry knit fabric of FIG. 2E can be knitted from first yarns and second yarns Y2 (52). There are two different first yarns Y1 (51a) and Y3 (51b). The knitting machine is set up for second yarn Y2 delivery and the knitting head cylinder is prepared with 15 short heels and 15 long heels. If an 8 feed knitter is used, then 2 packages of Y1, 1 package of Y3 and 1 package of Y2 are placed in the sequence Y3, no yarn, Y1, Y2, Y1, no yarn on the knitter deck. The knitter places 10 courses per inch (4 course per cm) along the length of the hose and uses 30 needles (15 short butt needles and 15 long butt needles in a repeat arrangement of 1 long butt needle followed by 1 short butt needle) so as to produce a fabric of FIG. 2E. The ratio of the length of second reinforcement yarn Y2 to the length of first reinforcement yarns Y1 and Y3 within the course where the yarns are present is in the ratio of 1.0:2.9

A hose may be made by a similar method to that of Example A except that the knit fabric of Example 5 is used.

Hoses constructed as per Examples 1-4 having knit fabrics comprising intertwined second yarns will demonstrate improved mechanical performance such as burst pressure resistance and fatigue resistance when compared with a hose constructed as per Example A that does not have a second yarn in the knit fabric.

What is claimed is:

1. A knit fabric suitable as a reinforcement for tubular elastomeric articles or a fiber-reinforced composite structure wherein the fabric comprises a plurality of first filamentary yarns having a tenacity of 2.5-56 g/dtex and a linear density of 222-10000 dtex that form the loops of the knit of the fabric, the fabric further comprises at least one second filamentary yarn having a tenacity of 2.5-56 g/dtex and a linear density of 222-10000 dtex that, within a course of the fabric, passes in a helical direction in front of all first filamentary yarns in that course and is intertwined with at least some of the first filamentary yarns in an adjacent course, and within a course of the fabric, the length of second filamentary yarn to the length of first filamentary yarn is in the ratio of from 1.0:1.72 to 1.0:6.0.

2. The fabric of claim 1 wherein the filaments of the first filamentary yarn are polymeric, and wherein the polymer of the filaments of the first filamentary yarn is aromatic polyamide, aromatic copolyamide, polyazole, polyester, aliphatic polyamide, poly(trimethylene terephthalate) and blends thereof.

3. The fabric of claim 1 wherein the filaments of the second filamentary yarn are polymeric, and wherein the polymer of the filaments of the second filamentary yarn is aromatic polyamide, aromatic copolyamide, polyazole, polyester, aliphatic polyamide and blends thereof.

4. The fabric of claim 1 wherein the first filamentary yarn in one course of fabric is different from the first filamentary yarn in another course of fabric.

5. The fabric of claim 1 wherein the second filamentary yarn in one course of fabric is different from the second filamentary yarn in another or an adjacent course of fabric.

6. The fabric of claim 1 wherein the second filamentary yarn has an elongation at break that is greater than the elongation at break of the first filamentary yarn.

7. The fabric of claim 1 wherein the filaments of the first filamentary yarn and the filaments of the second filamentary yarn are polymeric, and the first filamentary yarn comprises filaments of a different polymer from the polymer of the filaments of the second filamentary yarn.

8. The fabric of claim 7, wherein the polymer of the filaments of the first filamentary yarn is para-aramid and the polymer of the filaments of the second filamentary yarn is meta-aramid.

9. The fabric of claim 1, wherein the modulus of the second filamentary yarn is less than the modulus of the first filamentary yarn.

10. A hose comprising the knit fabric of claim 1.

11. A fiber-reinforced composite structure comprising the knit fabric of claim 1 and a matrix resin.

* * * * *